(12) United States Patent
Yu

(10) Patent No.: US 9,351,159 B2
(45) Date of Patent: May 24, 2016

(54) METHOD AND APPARATUS FOR BINDING UNIVERSAL INTEGRATED CIRCUIT CARD AND MACHINE TYPE COMMUNICATION DEVICE

(75) Inventor: Wantao Yu, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 191 days.

(21) Appl. No.: 14/344,882

(22) PCT Filed: Jan. 16, 2012

(86) PCT No.: PCT/CN2012/070415
§ 371 (c)(1),
(2), (4) Date: Mar. 13, 2014

(87) PCT Pub. No.: WO2013/071707
PCT Pub. Date: May 23, 2013

(65) Prior Publication Data
US 2014/0302816 A1   Oct. 9, 2014

(30) Foreign Application Priority Data

Nov. 15, 2011   (CN) .......................... 2011 1 0361943

(51) Int. Cl.
*H04M 1/66*   (2006.01)
*H04W 12/04*   (2009.01)
(Continued)

(52) U.S. Cl.
CPC .............. *H04W 12/04* (2013.01); *H04L 63/068* (2013.01); *H04W 4/005* (2013.01); *H04L 63/06* (2013.01); *H04L 63/101* (2013.01); *H04L 2209/88* (2013.01); *H04W 12/08* (2013.01)

(58) Field of Classification Search
CPC ..... H04W 36/18; H04W 36/30; H04W 12/12; H04W 12/06

USPC .......................................... 455/410, 436, 411
See application file for complete search history.

(56) References Cited

U.S. PATENT DOCUMENTS

2005/0020308 A1   1/2005 Lai
2009/0209232 A1*  8/2009 Cha ..................... H04L 63/0428
                                                         455/411
2011/0077051 A1   3/2011 Brown

FOREIGN PATENT DOCUMENTS

CN   102026241 A   4/2011
CN   102075909 A   5/2011
(Continued)

OTHER PUBLICATIONS

3GPP TS 33.110 v10.1.0, mailed on Jun. 2011.
(Continued)

*Primary Examiner* — Chuck Huynh
(74) *Attorney, Agent, or Firm* — Oppedahl Patent Law Firm LLC

(57) ABSTRACT

The disclosure discloses a method and apparatus for binding a UICC and an MTC device to solve a problem of restriction to a binding relationship imposed by a life cycle of a pre-shared key Ks_local when binding of the MTC device and the UICC is implemented by way of GBA-U. With the disclosure, after a binding relationship between the MTC device and the UICC is established on the UICC, when a stored key shared by the MTC device and the UICC expires, a key Ks_local shared by the UICC and the MTC device can be re-established through a process of establishing the shared key Ks_local based on the GBA-U according to the established binding relationship, such that the binding relationship between the UICC and the MTC device is not restricted by the life cycle of a shared key Ks_local.

20 Claims, 2 Drawing Sheets

(51) Int. Cl.
*H04W 4/00* (2009.01)
*H04L 29/06* (2006.01)
*H04W 12/08* (2009.01)

(56) References Cited

FOREIGN PATENT DOCUMENTS

| CN | 102083212 A | 6/2011 |
|---|---|---|
| CN | 102238534 A | 11/2011 |
| WO | 2009046400 A1 | 4/2009 |

OTHER PUBLICATIONS

Supplementary European Search Report in European application No. 12848812.9, mailed on Mar. 18, 2015.

English Translation of the Written Opinion of the International Search Authority in international application No. PCT/CN2012/070415, mailed on Aug. 30, 2012. (5 pages—see entire document).

International Search Report in international application No. PCT/CN2012/070415, mailed on Aug. 30, 2012. (2 pages—see entire document).

* cited by examiner

METHOD AND APPARATUS FOR BINDING UNIVERSAL INTEGRATED CIRCUIT CARD AND MACHINE TYPE COMMUNICATION DEVICE

TECHNICAL FIELD

The disclosure relates to technologies related to a mobile communication system and Machine Type Communication (MTC) techniques, and in particular to a method and apparatus for binding a Universal Integrated Circuit Card (UICC) and an MTC device.

BACKGROUND

MTC is a blanket term for a series of techniques and combination thereof for implementing data communication and exchange among machines and between a machine and a human being using radio communication techniques. There are two meanings associated with MTC: one refers to a machine known per se as a smart device in an Embedded field, and the other refers to a connection among machines that connects the machines together via a network. MTC applies widely to fields such as smart measurement, remote monitoring, tracking, medical treatment, etc., and enables a more intelligent life. Compared with traditional communication among people, MTC devices are huge in number, apply widely, and have enormous market prospect.

In MTC, techniques for long-distance connection mainly include a Global System for Mobile Communications (GSM)/a General Packet Radio Service (GPRS)/a Universal Mobile Telecommunications System (UMTS), and techniques for short-distance connection mainly include 802.11 b/g, Bluetooth, Zigbee, Radio Frequency Identification (RFID), etc. Due to its integration of wireless communication and information technology, MTC may be used for bidirectional communication, such as long-distance information-collecting, parameter-setting, and instruction-sending, and therefore may implement different application solutions such as safety monitoring, automatic vending, cargo tracking. Almost all devices involved in daily life may become potential service targets. MTC provides simple means for establishing a radio connection of real-time device data among systems, among remote devices, or to a person.

An example of architecture of an MTC system is as shown in FIG. 1, in which an MTC device communicates with an MTC server via a mobile communication network.

In a $3^{rd}$ Generation Partnership Project (3GPP) system, a GBA process may be for establishing a key shared by a UICC and a terminal for establishing a safe connection and performing safe communication between the UICC and the terminal. The safe connection established between the UICC and the terminal may be used to bind the terminal to the UICC. A method for binding a UICC with a terminal in the 3GPP may also be used to bind a UICC with an MTC device in the MTC system. The GBA refers to Generic Bootstrapping Architecture, a system architecture of which defines a general key agreement mechanism between a terminal and a server. FIG. 2 illustrates a network model of the GBA system architecture and reference points among network element entities thereof, as described below.

(1) A User Equipment (UE) is a blanket term for a terminal device (such as a mobile phone) and a Subscriber Identity Module (SIM)/Universal Subscriber Identity Module (USIM) card. The terminal may be a mobile terminal (such as a mobile phone) with a plug-in card, or a fixed terminal (such as a set-top box) with a plug-in card.

(2) A Network Application Function (NAF), i.e., an application server, implements an operational logic function of an application and provides a operational service for the terminal after the terminal is authenticated;

(3) A Bootstrapping Server Function (BSF), as a core network element of the GBA, implements authentication with the UE through an Authentication and Key Agreement (AKA) protocol, and agrees with the UE on a session key which is then used for communication between the UE and the NAF. The BSF can set a life cycle of the key according to a local policy.

(4) A Home Subscriber System (HSS) stores authentication data included in the (U)SIM card of the terminal, such as Ki in the SIM card.

(5) A Subscriber Locator Function (SLF) allows the BSF to acquire the name of an HSS storing relevant subscriber data by querying the SLF. No SLF is required in a single-HSS environment or when the BSF is configured to use a pre-assigned HSS.

In the MTC system, since an MTC device is required to perform communication without human intervention, a UICC on the MTC device may be used by an invalid subscriber during use. Therefore, it is required to bind the UICC with the MTC device to prevent use of the UICC by an invalid MTC device.

At present, a 3GPP network supports establishing a safe connection between the UICC and the terminal by key pre-sharing, and binding the UICC with the terminal through the safe connection. A way of key pre-sharing defined by the 3GPP is to establish a key Ks_local pre-shared by the UICC and the terminal by way of GBA with UICC-based enhancements (GBA-U), and to establish the safe connection between the UICC and the terminal using the Ks_local. A binding relationship between the UICC and the terminal established by way of the GBA-U is restricted by factors such as the life cycle of the Ks_local, such that the binding relationship established between the UICC and the terminal is only valid within the life cycle of the Ks_local. In the MTC system, if the binding relationship between the UICC and the MTC device is established by way of the GBA-U, then after the life cycle of the Ks_local expires, the restriction relationship between the UICC and the MTC device may become ineffective, in which case the UICC may be used by another invalid MTC device.

Thus, for the 3GPP network and the MTC system, when binding of the MTC device and the UICC is implemented by way of the GBA-U, a problem required to be solved is how to avoid the restriction to the established binding relationship imposed by the life cycle of the Ks_local.

SUMMARY

In view of the above, it is desired that the disclosure provides a method and apparatus for binding a UICC and an MTC device, solving the technical problem of restriction to the binding relationship imposed by a life cycle of a pre-shared key Ks_local when the binding of the MTC device and the UICC is implemented by way of the GBA-U.

To this end, a technical solution of the disclosure is implemented as follows.

A method for binding a Universal Integrated Circuit Card (UICC) and a Machine Type Communication (MTC) device, includes that:

when safe communication is required to be performed between an MTC device and a UICC, the MTC device checks whether there is a key Ks_local shared by the MTC device and the UICC, when there is no key Ks_local shared by the MTC device and the UICC, the MTC device starts a process of establishing a shared key Ks_local based on Generic Bootstrapping Architecture with UICC-based enhancements (GBA-U) to establish on the UICC a binding relationship between the UICC and the MTC device to implement binding of the UICC and the MTC device.

In an embodiment, the method may further include steps of:

when the MTC device detects that there is a key Ks_local shared by the MTC device and the UICC, sending, by the MTC device, the UICC a request to check whether there is a shared key Ks_local usable on the UICC, and receiving information fed back by the UICC on whether the shared key Ks_local requested in the requst is usable on the UICC, and when the requested Ks_local is not usable on the UICC, starting, by the MTC device, the process of establishing a shared key Ks_local based on the GBA-U, and establishing on the UICC the binding relationship between the UICC and the MTC device to implement the binding of the UICC and the MTC device.

In an embodiment, the step of establishing the binding relationship between the UICC and the MTC device may specifically be:

sending, by the MTC device, request information to the UICC to obtain at least a current B-TID and a life cycle of a key, wherein the request information includes information on an identity of the MTC device; and when the UICC determines, according to the information on the identity of the MTC device, that no binding relationship between the UICC and the MTC device is stored ona the UICC, establishing a key Ks_local shared by the UICC and the MTC device through the process of establishing a shared key Ks_local based on the GBA-U, and storing on the UICC the binding relationship between the UICC and the MTC device to implement the binding of the UICC and the MTC device.

In an embodiment, the binding relationship between the UICC and the MTC device may refer to an association between the UICC and the MTC device, and may be represented by a relationship for mapping an identification ICCID of the UICC to an identification Terminal_ID of the MTC device.

In an embodiment, the binding relationship between the UICC and the MTC device may refer to an association between a Universal Subscriber Identity Module (USIM) on the UICC and the MTC device, and may be represented by a relationship for mapping information on an identity of the USIM to information on the identity of the MTC device.

In an embodiment, the binding relationship between the UICC and the MTC device may refer to an association between an application on the UICC and an application on the MTC device, and may be represented by a relationship for mapping an identification UICC_appli_ID of the application on the UICC to an identification Terminal_appli_ID of the application on the MTC device, or by a relationship for mapping both an identification ICCID of the UICC and the identification UICC_appli_ID of the application on the UICC to both an identification Terminal_ID of the MTC device and the identification Terminal_appli_ID of the application on the MTC device, or by a relationship for mapping both information on an identity of a Universal Subscriber Identity Module (USIM) on the UICC, namely, an International Mobile Subscriber Identification Number (IMSI), and the identification UICC_appli_ID of the application on the UICC to both the information on the identity of the MTC device, namely, an International Mobile Equipment Identity (IMEI) or an IMEI-and-Software-Version (IMEISV), and the identification Terminal_appli_ID of the application on the MTC device.

In an embodiment, the binding relationship between the UICC and the MTC device may refer to a binding relationship between the UICC and one or more MTC devices, and refer to, when the UICC is bound with multiple MTC devices, an association between a Universal Subscriber Identity Module (USIM) on the UICC and the multiple MTC devices, or an association between an application on the UICC and applications on the multiple MTC devices.

In an embodiment, a relationship for mapping the UICC to the MTC device may be stored in an association table on the UICC.

In an embodiment, when no association table for associating the UICC with the MTC device is stored on the UICC, or when the association table for associating the UICC with the MTC device is empty, the UICC may determine that no relationship for mapping the UICC to the MTC device is stored on the UICC.

In an embodiment, the method may further include steps of:

when the association table for associating the UICC with the MTC device is stored on the UICC and is not empty, and in case that the MTC device requests for establishing a key shared with the UICC by way of the GBA-U, determining, by the UICC, through a stored binding relationship, whether the MTC device is an MTC device authorized to use the UICC; when the MTC device is an MTC device authorized to use the UICC, establishing the key shared by the MTC device and the UICC by way of the GBA-U; or when the MTC device is not an MTC device authorized to use the UICC, rejecting, by the UICC, the request of the MTC device for establishing the key Ks_local shared by the MTC device and the UICC.

In an embodiment, the binding relationship between the UICC and the MTC device may be set and updated by directly setting and updating by a subscriber the association table stored on the UICC in a safe manner, or by setting and updating Over The Air (OTA), the binding relationship between the UICC and the MTC device stored on the UICC.

According to the method provided by the disclosure, the disclosure further provides an apparatus for binding a Universal Integrated Circuit Card (UICC) and a Machine Type Communication (MTC) device, including:

a checking module configured to check, when safe communication is required to be performed between an MTC device and a UICC, whether there is a valid key Ks_local shared by the MTC device and the UICC; and a binding module configured to: when there is no valid key Ks_local shared by the MTC device and the UICC, start a process of establishing a shared key Ks_local based on Generic Bootstrapping Architecture with UICC-based enhancements (GBA-U) to establish on the UICC a binding relationship between the UICC and the MTC device to implement binding of the UICC and the MTC device.

After a binding relationship between the MTC device and the UICC is established on the UICC, when a stored key shared by the MTC device and the UICC expires, a key Ks_local shared by the UICC and the MTC device can be re-established through a process of establishing the shared key Ks_local based on the GBA-U according to the established binding relationship, such that the binding relationship between the UICC and the MTC device is not restricted by the life cycle of a shared key Ks_local.

DETAILED DESCRIPTION

To make a purpose, a technical solution and advantages of the disclosure clearer and easier to understand, the disclosure is further elaborated with reference to embodiments and the drawings.

Figure 1:
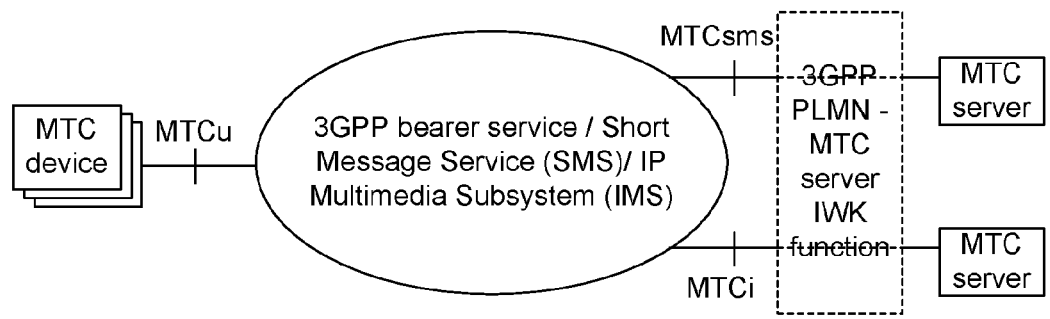
FIG. 1 is a diagram of architecture of an MTC system.
Figure 2:
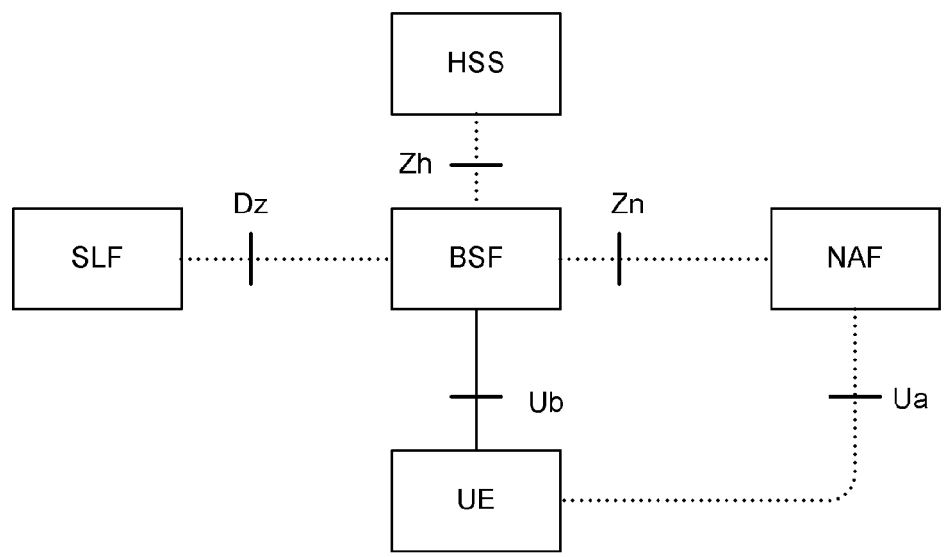
FIG. 2 is a network model of GBA system architecture.
Figure 3:
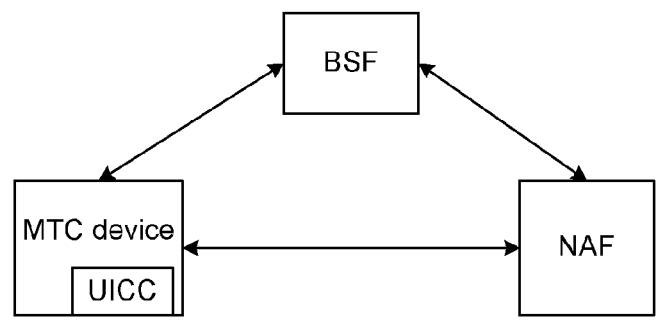
FIG. 3 is a diagram of a network model for establishing a key shared by an MTC device and a UICC by way of GBA-U according to the disclosure.

In the disclosure, an MTC device refers to a device for communication among machines in a mobile communication network, and a UICC is installed on the MTC device. A subscriber identifying module (such as a SIM, a USIM, or an Internet Protocol (IP) Multimedia Service Identity Module (ISIM)) is located on the UICC. A BSF and the MTC device implement authentication through an AKA protocol, and the BSF can set a life cycle of a key according to a local policy. A NAF is in charge of a process of establishing a key shared by the UICC and the MTC device, and in the disclosure, the NAF refers to a key center for establishing a key shared by the MTC device and the UICC, and may be located inside or outside the mobile communication network. In the disclosure, as shown in FIG. 3, a key Ks_local shared by the MTC device and the UICC is established by way of GBA-U.

In the disclosure, when no association table for associating the UICC with the MTC device is stored on the UICC, or when the association table for associating the UICC with the MTC device is empty, a key shared by the UICC and any MTC device may be established by way of GBA-U, then a binding relationship between the UICC and the MTC device is established on the UICC and is stored into the association table for associating the UICC with the MTC device to implement the binding of the UICC and the MTC device, so as to restrict use of the UICC on a specific MTC device.

In the disclosure, the binding relationship between the UICC and the MTC device may specifically refer to an association between the UICC and the MTC device, in which case, the binding relationship between the UICC and the MTC device may be represented by a relationship for mapping an identification ICCID of the UICC to an identification Terminal_ID of the MTC device.

In the disclosure, specifically, the binding relationship between the UICC and the MTC device may also refer to an association between a USIM on the UICC and the MTC device, in which case, the binding relationship between the UICC and the MTC device may be represented by a relationship for mapping information on an identity of the USIM on the UICC to information on the identity of the MTC device. The information on the identity of the USIM may be an International Mobile Subscriber Identification Number (IMSI), and the information on the identity of the MTC device may be an International Mobile Equipment Identity (IMEI) or an IMEI-and-Software-Version (IMEISV).

In the disclosure, specifically, the binding relationship between the UICC and the MTC device may also refer to an association between an application on the UICC and an application on the MTC device, in which case, the binding relationship between the UICC and the MTC device may be represented by a relationship for mapping an identification (UICC_appli_ID) of the application on the UICC to an identification (Terminal_appli_ID) of the application on the MTC device, or by a relationship for mapping both an identification ICCID of the UICC and the identification (UICC_appli_ID) of the application on the UICC to both an identification (Terminal_ID) of the MTC device and the identification (Terminal_appli_ID) of the application on the MTC device, or by a relationship for mapping both information on an identity of a USIM on the UICC, namely, an International Mobile Subscriber Identification Number (IMSI), and the identification (UICC_appli_ID) of the application on the UICC to both the information on the identity of the MTC device (IMEI or IMEISV) and the identification (Terminal_appli_ID) of the application on the MTC device.

In the disclosure, the UICC may be bound with one or more MTC devices. When the UICC is bound with multiple MTC devices, it may specifically mean that a USIM on the UICC is associated with the multiple MTC devices, namely, the information on the identity of the USIM may be mapped simultaneously to information on identities of the multiple MTC devices. When the UICC is bound with multiple MTC devices, it also may specifically mean that an application on the UICC is associated with applications on the multiple MTC devices.

In the disclosure, an MTC device may be bound with one or more UICCs.

In the disclosure, the binding relationship between the UICC and the MTC device is stored in an association table on the UICC; for example, the information on the identity of an MTC device associated with the UICC is stored in a list of authorized devices on the UICC.

Embodiments of the disclosure are described taking only a 3GPP network as an example, which however should not be construed as the disclosure being limited to the 3GPP network. A method and apparatus provided by the disclosure also apply to other communication networks.

Figure 4:
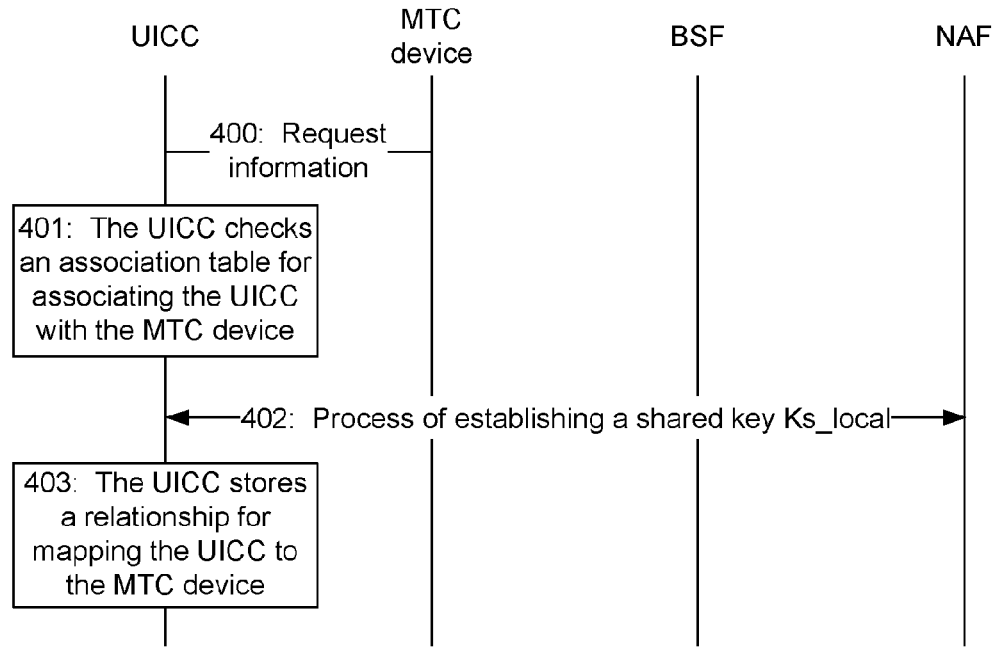
FIG. 4 is a flowchart of binding a UICC and an MTC device provided by an embodiment of the disclosure.

FIG. 4 is a flowchart of binding a UICC and an MTC device provided by an embodiment of the disclosure. As shown in FIG. 4, the flow of binding a UICC and an MTC device includes steps as follows.

Step 400: An MTC device sends request information to a UICC to obtain at least information such as a current B-TID and a life cycle of a key. The request information includes information on an identity of the MTC device, and the information on the identity of the MTC device includes an identification (Terminal_ID) of the MTC device or information on the identity (IMEI or IMEISV) of the MTC device, and may further include information such as an identification (Terminal_appli_ID) of an application on the MTC device.

Step 401: The UICC determines that no association table for associating the UICC with the MTC device is stored on the UICC, or that the association table for associating the UICC with the MTC device is empty.

Step 402: a key Ks_local shared by the UICC and the MTC device is established through a process of establishing a shared key Ks_local based on GBA-U.

Step 403: a relationship for mapping the UICC to the MTC device is stored in the association table on the UICC, namely, a binding relationship between the UICC and the MTC device is stored on the UICC.

In the disclosure, a binding relationship between a UICC and an MTC device may be preset on the UICC.

In the disclosure, once a binding relationship between a UICC and an MTC device is established, an association table stored on the UICC may be set and updated directly by a subscriber in a safe manner.

In the disclosure, once a binding relationship between a UICC and an MTC device is established, a system may set and update Over The Air (OTA) an association table for associating the UICC with the MTC device stored on the UICC.

Before an MTC device starts a process of establishing a shared key Ks_local based on the GBA-U, a key Ks_local shared by the MTC device and a UICC is required when safe communication needs to be performed between the MTC device and the UICC. To this end, the MTC device needs to check whether there is a valid Ks_local shared by the MTC device and the UICC, if there is no valid Ks_local, then the MTC device starts the process of establishing a shared key Ks_local based on the GBA-U.

Figure 5:
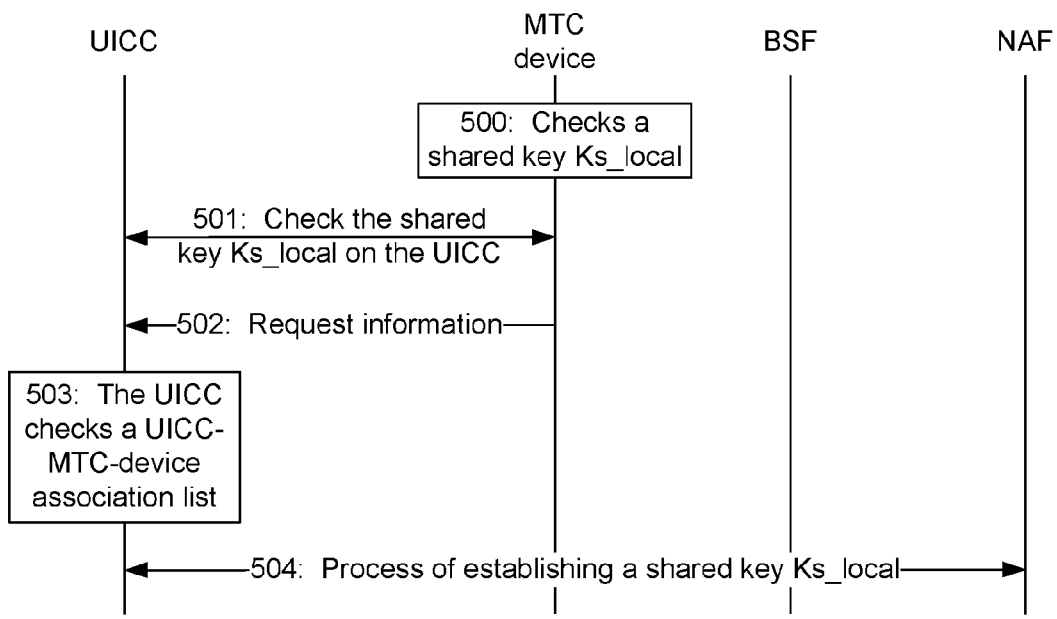
FIG. 5 is a flowchart of establishing a key shared by a UICC and an MTC device provided by an embodiment of the disclosure.

FIG. 5 is a flowchart of establishing a key shared by a UICC and an MTC device according to the disclosure. As shown in FIG. 5, the flow of establishing a key Ks_local shared by a UICC and an MTC device based on GBA-U includes steps as follows.

Step 500: An MTC device checks whether a valid Ks_local for communication with a UICC is stored locally. If there is no valid Ks_local on the MTC device, then Step 502 is performed, and the MTC device starts a process of establishing a shared key Ks_local based on the GBA-U. If there is a valid Ks_local stored on the MTC device, then Step 501 is performed.

Step 501: The MTC device sends a request to the UICC to check whether a Ks_local is usable on the UICC. Then the UICC feeds back information on whether the requested Ks_local is usable on the UICC. If the requested Ks_local is usable on the UICC, then there is a valid key Ks_local shared by the MTC device and the UICC. If the requested Ks_local is not usable on the UICC, then Step 502 is performed.

Step 502: The MTC device sends request information to the UICC to obtain information such as a current B-TID and a life cycle of a key. The request information includes information on an identity of the MTC device; the information on the identity of the MTC device includes an identification (Terminal_ID) of the MTC device or information on the identity (IMEI or IMEISV) of the MTC device, and may further include information such as an identification (Terminal_appli_ID) of an application on the MTC device.

Step 503: The UICC checks, according to a stored association table for associating the UICC with the MTC device and the received information on the identity of the MTC device, whether the MTC device is an MTC device bound with the UICC. If the MTC device is not an MTC device bound with the UICC, then the UICC rejects the request of the MTC device. If the MTC device is an MTC device bound with the UICC, then Step 504 is performed.

Step 504: A key Ks_local shared by the UICC and the MTC device is established through a process of establishing a shared key Ks_local based on GBA-U.

The disclosure further provides an apparatus for binding a UICC and an MTC device, including:

a checking module configured to check, when safe communication is required to be performed between an MTC device and a UICC, whether there is a valid key Ks_local shared by the MTC device and the UICC; and a binding module configured to: when there is no valid key Ks_local shared by the MTC device and the UICC, start a process of establishing a shared key Ks_local based on Generic Bootstrapping Architecture with UICC-based enhancements (GBA-U) to establish on the UICC a binding relationship between the UICC and the MTC device to implement binding of the UICC and the MTC device.

In an embodiment, the apparatus may further include a usable key checking module configured to: when it is detected that there is a valid key Ks_local shared by the MTC device and the UICC, send the UICC a request to check whether there is a shared key Ks_local usable on the UICC, such that the UICC feeds back to the MTC device information on whether the shared key Ks_local requested in the requst is usable on the UICC, wherein the binding module may further configured to: when the requested Ks_local is not usable on the UICC, start the process of establishing a shared key Ks_local based on the GBA-U to establish the binding relationship between the UICC and the MTC device.

In an embodiment, the binding module may include:

a requesting module configured to send request information to the UICC to obtain at least a current B-TID and a life cycle of a key, wherein the request information includes information on an identity of the MTC device;

a binding-relationship determining module configured to determine, according to the information on the identity of the MTC device, whether any binding relationship between the UICC and the MTC device is stored on the UICC;

a key establishing module configured to, when no binding relationship between the UICC and the MTC device is stored on the UICC, establish a key Ks_local shared by the UICC and the MTC device through the process of establishing a shared key Ks_local based on the GBA-U; and a binding-relationship storing module configured to store on the UICC the binding relationship between the UICC and the MTC device to implement the binding of the UICC and the MTC device.

In an embodiment, the binding-relationship storing module is configured to store on the UICC a relationship for mapping the UICC to the MTC device using an association table.

In an embodiment, when when no association table for associating the UICC with the MTC device is stored on the UICC, or when the association table for associating the UICC with the MTC device is empty, the binding-relationship determining module determines that no relationship for mapping the UICC to the MTC device is stored on the UICC.

In an embodiment, the binding-relationship determining module is further configured to determine, through a stored binding relationship, whether the MTC device is an MTC device authorized to use the UICC when the association table for associating the UICC with the MTC device is stored on the UICC and is not empty, and in case that the MTC device requests for establishing a key shared with the UICC by way of the GBA-U; and the key establishing module is further configured to: when the MTC device is an MTC device authorized to use the UICC, establish the key Ks_local shared by the MTC device and the UICC by way of the GBA-U; or when the MTC device is not an MTC device authorized to use the UICC, reject the request for establishing the key Ks_local shared by the MTC device and the UICC.

What described are merely embodiments of the disclosure, and are not intended to limit the scope of the disclosure.

INDUSTRIAL APPLICABILITY

In the disclosure, after a binding relationship between a MTC device and a UICC is established on the UICC, when a shared key stored on the UICC and the MTC device expires, a key Ks_local shared by the UICC and the MTC device can be re-established through a process of establishing the shared key Ks_local based on the GBA-U according to the established binding relationship, such that the binding relationship between the UICC and the MTC device is not restricted by the life cycle of a shared key Ks_local.

The invention claimed is:

1. A method for binding a Universal Integrated Circuit Card (UICC) and a Machine Type Communication (MTC) device, comprising:
when safe communication is required to be performed between an MTC device and a UICC, checking, by the MTC device, whether there is a key Ks_local shared by the MTC device and the UICC, when there is no key Ks_local shared by the MTC device and the UICC, starting, by the MTC device, a process of establishing a shared key Ks_local based on Generic Bootstrapping Architecture with UICC-based enhancements (GBA-U), and establishing on the UICC a binding relationship between the UICC and the MTC device to implement binding of the UICC and the MTC device,
wherein the step of establishing the binding relationship between the UICC and the MTC device comprises:
sending, by the MTC device, request information to the UICC to obtain at least a current B-TID and a life cycle of a key, wherein the request information comprises information on an identity of the MTC device; and
when the UICC determines, according to the information on the identity of the MTC device, that no binding relationship between the UICC and the MTC device is stored on the UICC, establishing a key Ks_local shared by the UICC and the MTC device through the process of establishing a shared key Ks_local based on the GBA-U, and storing on the UICC the binding relationship between the UICC and the MTC device to implement the binding of the UICC and the MTC device.

2. The method according to claim 1, further comprising:
when the MTC device detects that there is a key Ks_local shared by the MTC device and the UICC, sending, by the MTC device, the UICC a request to check whether there is a shared key Ks_local usable on the UICC, and receiving information fed back by the UICC on whether the shared key Ks_local requested in the requst is usable on the UICC, and when the requested Ks_local is not usable on the UICC, starting, by the MTC device, the process of establishing a shared key Ks_local based on the GBA-U, and establishing on the UICC the binding relationship between the UICC and the MTC device to implement the binding of the UICC and the MTC device.

3. The method according to claim 1, wherein the binding relationship between the UICC and the MTC device refers to an association between the UICC and the MTC device.

4. The method according to claim 3, wherein the binding relationship between the UICC and the MTC device is represented by a relationship for mapping an identification ICCID of the UICC to an identification Terminal_ID of the MTC device, or
the binding relationship between the UICC and the MTC device refers to an association between a Universal Subscriber Identity Module (USIM) on the UICC and the MTC device, and is represented by a relationship for mapping information on an identity of the USIM to information on the identity of the MTC device, or
the binding relationship between the UICC and the MTC device refers to an association between an application on the UICC and an application on the MTC device, and is represented by a relationship for mapping an identification UICC_appli_ID of the application on the UICC to an identification Terminal_appli_ID of the application on the MTC device, or by a relationship for mapping both an identification ICCID of the UICC and the identification UICC_appli_ID of the application on the UICC to both an identification Terminal_ID of the MTC device and the identification Terminal_appli_ID of the application on the MTC device, or by a relationship for mapping both information on an identity of a Universal Subscriber Identity Module (USIM) on the UICC, namely, an International Mobile Subscriber Identification Number (IMSI), and the identification UICC_appli_ID of the application on the UICC to both the information on the identity of the MTC device, namely, an International Mobile Equipment Identity (IMEI) or an IMEI-and-Software-Version (IMEISV), and the identification Terminal_appli_ID of the application on the MTC device.

5. The method according to claim 1, wherein the binding relationship between the UICC and the MTC device refers to a binding relationship between the UICC and one or more MTC devices, and refers to, when the UICC is bound with multiple MTC devices, an association between a Universal Subscriber Identity Module (USIM) on the UICC and the multiple MTC devices, or an association between an application on the UICC and applications on the multiple MTC devices.

6. The method according to claim 4, wherein a relationship for mapping the UICC to the MTC device is stored in an association table on the UICC.

7. The method according to claim 6, wherein when no association table for associating the UICC with the MTC device is stored on the UICC, or when the association table for associating the UICC with the MTC device is empty, the UICC determines that no relationship for mapping the UICC to the MTC device is stored on the UICC.

8. The method according to claim 6, further comprising:
when the association table for associating the UICC with the MTC device is stored on the UICC and is not empty, and in case that the MTC device requests for establishing a key shared with the UICC by way of the GBA-U, determining, by the UICC, through a stored binding relationship, whether the MTC device is an MTC device authorized to use the UICC; when the MTC device is an MTC device authorized to use the UICC, establishing the key shared by the MTC device and the UICC by way of the GBA-U; or when the MTC device is not an MTC device authorized to use the UICC, rejecting, by the UICC, the request of the MTC device for establishing the key Ks_local shared by the MTC device and the UICC.

9. The method according to claim 6, wherein the binding relationship between the UICC and the MTC device is set and updated by directly setting and updating by a subscriber the association table stored on the UICC in a safe manner, or by setting and updating Over The Air (OTA), the binding relationship between the UICC and the MTC device stored on the UICC.

10. The method according to claim 5, wherein a relationship for mapping the UICC to the MTC device is stored in an association table on the UICC.

11. The method according to claim 10, wherein when no association table for associating the UICC with the MTC device is stored on the UICC, or when the association table for associating the UICC with the MTC device is empty, the UICC determines that no relationship for mapping the UICC to the MTC device is stored on the UICC.

12. The method according to claim 10, further comprising:
when the association table for associating the UICC with the MTC device is stored on the UICC and is not empty, and in case that the MTC device requests for establishing a key shared with the UICC by way of the GBA-U, determining, by the UICC, through a stored binding relationship, whether the MTC device is an MTC device authorized to use the UICC; when the MTC device is an MTC device authorized to use the UICC, establishing the key shared by the MTC device and the UICC by way of the GBA-U; or when the MTC device is not an MTC device authorized to use the UICC, rejecting, by the UICC, the request of the MTC device for establishing the key Ks_local shared by the MTC device and the UICC.

13. The method according to claim 10, wherein the binding relationship between the UICC and the MTC device is set and updated by directly setting and updating by a subscriber the association table stored on the UICC in a safe manner, or by setting and updating Over The Air (OTA), the binding relationship between the UICC and the MTC device stored on the UICC.

14. An apparatus for binding a Universal Integrated Circuit Card (UICC) and a Machine Type Communication (MTC) device, comprising:
 a checking module configured to check, when safe communication is required to be performed between an MTC device and a UICC, whether there is a valid key Ks_local shared by the MTC device and the UICC; and
 a binding module configured to: when there is no valid key Ks_local shared by the MTC device and the UICC, start a process of establishing a shared key Ks_local based on Generic Bootstrapping Architecture with UICC-based enhancements (GBA-U) to establish on the UICC a binding relationship between the UICC and the MTC device to implement binding of the UICC and the MTC device,
 wherein the binding module comprises: a requesting module configured to send request information to the UICC to obtain at least a current B-TID and a life cycle of a key, wherein the request information comprises information on an identity of the MTC device;
 a binding-relationship determining module configured to determine, according to the information on the identity of the MTC device, whether any binding relationship between the UICC and the MTC device is stored on the UICC; a key establishing module configured to, when no binding relationship between the UICC and the MTC device is stored on the UICC, establish a key Ks_local shared by the UICC and the MTC device through the process of establishing a shared key Ks_local based on the GBA-U; and a binding-relationship storing module configured to store on the UICC the binding relationship between the UICC and the MTC device to implement the binding of the UICC and the MTC device.

15. The apparatus according to claim 14, wherein
 the binding relationship between the UICC and the MTC device refers to an association between the UICC and the MTC device, and is represented by a relationship for mapping an identification ICCID of the UICC to an identification Terminal_ID of the MTC device; or
 the binding relationship between the UICC and the MTC device refers to an association between a Universal Subscriber Identity Module (USIM) on the UICC and the MTC device, and is represented by a relationship for mapping information on an identity of the USIM to information on the identity of the MTC device; or
 the binding relationship between the UICC and the MTC device refers to an association between an application on the UICC and an application on the MTC device, and is represented by a relationship for mapping an identification UICC_appli_ID of the application on the UICC to an identification Terminal_appli_ID of the application on the MTC device, or by a relationship for mapping both an identification ICCID of the UICC and the identification UICC_appli_ID of the application on the UICC to both an identification Terminal_ID of the MTC device and the identification Terminal_appli_ID of the application on the MTC device, or by a relationship for mapping both information on an identity of a Universal Subscriber Identity Module (USIM) on the UICC, namely, an International Mobile Subscriber Identification Number (IMSI), and the identification UICC_appli_ID of the application on the UICC to both the information on the identity of the MTC device, namely, an International Mobile Equipment Identity (IMEI) or an IMEI-and-Software-Version (IMEISV), and the identification Terminal_appli_ID of the application on the MTC device.

16. The apparatus according to claim 14, wherein the binding relationship between the UICC and the MTC device refers to a binding relationship between the UICC and one or more MTC devices, and refers to, when the UICC is bound with multiple MTC devices, an association between a Universal Subscriber Identity Module (USIM) on the UICC and the multiple MTC devices, or an association between an application on the UICC and applications on the multiple MTC devices.

17. The apparatus according to claim 14, wherein the binding-relationship storing module is configured to store on the UICC a relationship for mapping the UICC to the MTC device using an association table.

18. The apparatus according to claim 17, wherein when no association table for associating the UICC with the MTC device is stored on the UICC, or when the association table for associating the UICC with the MTC device is empty, the binding-relationship determining module determines that no relationship for mapping the UICC to the MTC device is stored on the UICC.

19. The apparatus according to claim 17, wherein the binding-relationship determining module is further configured to determine, through a stored binding relationship, whether the MTC device is an MTC device authorized to use the UICC when the association table for associating the UICC with the MTC device is stored on the UICC and is not empty, and in case that the MTC device requests for establishing a key shared with the UICC by way of the GBA-U; and
 the key establishing module is further configured to: when the MTC device is an MTC device authorized to use the UICC, establish the key Ks_local shared by the MTC device and the UICC by way of the GBA-U; or when the MTC device is not an MTC device authorized to use the UICC, reject the request for establishing the key Ks_local shared by the MTC device and the UICC.

20. The apparatus according to claim 14, further comprising:
 a usable key checking module configured to: when it is detected that there is a valid key Ks_local shared by the MTC device and the UICC, send the UICC a request to check whether there is a shared key Ks_local usable on the UICC, such that the UICC feeds back to the MTC device information on whether the shared key Ks_local requested in the request is usable on the UICC,
 wherein the binding module is further configured to: when the requested Ks_local is not usable on the UICC, start the process of establishing a shared key Ks_local based on the GBA-U to establish the binding relationship between the UICC and the MTC device.

* * * * *